(12) United States Patent
Lo

(10) Patent No.: US 9,868,050 B1
(45) Date of Patent: Jan. 16, 2018

(54) DUPLICATE PLAYING CARD OUTPUT AND RECYCLING DEVICE

(71) Applicant: Bingotimes Digital Technology Co., Ltd., Taichung (TW)

(72) Inventor: Chih-Tsung Lo, Taichung (TW)

(73) Assignee: Bingotimes Digital Technology Co., Ltd., Taichung (TW)

( * ) Notice: Subject to any disclaimer, the term of this patent is extended or adjusted under 35 U.S.C. 154(b) by 0 days.

(21) Appl. No.: 15/414,568

(22) Filed: Jan. 24, 2017

(51) Int. Cl.
| A63F 1/06 | (2006.01) |
| G06K 15/02 | (2006.01) |
| G06K 15/16 | (2006.01) |
| G06F 3/12 | (2006.01) |

(52) U.S. Cl.
CPC .............. *A63F 1/06* (2013.01); *G06F 3/1219* (2013.01); *G06K 15/022* (2013.01); *G06K 15/16* (2013.01); *G06K 2215/0097* (2013.01)

(58) Field of Classification Search
CPC .... G06F 3/1219; G06K 15/16; G06K 15/022; G06K 2215/0097; A63F 1/06
See application file for complete search history.

(56) References Cited

U.S. PATENT DOCUMENTS

| 9,114,315 B1* | 8/2015 | Tseng | A63F 1/14 |
| 2004/0259618 A1* | 12/2004 | Soltys | A63F 1/02 |
| | | | 463/11 |
| 2007/0238506 A1* | 10/2007 | Ruckle | G07F 17/32 |
| | | | 463/16 |
| 2008/0150231 A1* | 6/2008 | Moody | A63F 1/14 |
| | | | 273/149 R |
| 2013/0337922 A1* | 12/2013 | Kuhn | A63F 1/06 |
| | | | 463/47 |

* cited by examiner

*Primary Examiner* — Michael Dennis
(74) *Attorney, Agent, or Firm* — Raymond Y. Chan; David and Raymond Patent Firm

(57) ABSTRACT

A duplicate playing card output and recycling device is provided for an electronic game system to print, output, and recycle playing cards. The device is connected to the game system to print a duplicate playing card having the same suit and numeral as that dealt by the electronic game system. The device includes a printing device and a recycling device. The printing device is able to print the duplicate playing card to the player. The recycling device is able to recycle the duplicate playing card. The device enhances the fun and excitement of the game, and the duplicate playing card won't be arbitrarily disposed.

4 Claims, 6 Drawing Sheets

DUPLICATE PLAYING CARD OUTPUT AND RECYCLING DEVICE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a duplicate playing card output and recycling device, and more particularly to a playing card output and recycling device capable of printing and copying a real playing card same as that of the electronic game so as to give the player a real feeling of touching the playing card, and the playing card can be collected after use.

Description of Related Arts

Poker is a widely popular card game. According to different rules of the game, the players can have different fun. In a critical time, the players usually squint to know the cards to enhance the fun and excitement of the game. These days, an automated playing card game system is developed. The game system comprises a server, a deal device, a robotic arm, a recycling device and a terminal, which can deal, turn over, change, set, and clear the cards automatically and show the players the cards, no need to manually touch. Although it can avoid human cheat to improve the fairness and the speed of the game, but the players don't have a true feeling of playing cards and cannot squint at the poker cards. This way greatly reduces the fun and excitement of the electronic automated poker game. Accordingly, the inventor of the present invention has devoted himself based on his many years of practical experiences to solve these problems.

Accordingly, the inventor of the present invention has devoted himself based on his many years of practical experiences to solve these problems.

SUMMARY OF THE PRESENT INVENTION

The primary object of the present invention is to solve the aforesaid problems and to provide a duplicate playing card output and recycling device which is very practical.

An object of the present invention is that the duplicate playing card output and recycling device is connected to an electronic playing card game system to print a duplicate playing card having the same suit and numeral when the electronic playing card game system deals. The duplicate playing card printed by a printing device is guided to the player to give the player a real feeling of touching the playing card for the electronic playing card game system. After use, the duplicate playing card is inserted into a recycling box to be collected, not causing an untidy environment.

Another object of the present invention is that the printing device is provided with a movable frame, thereby facilitating replenishment of printing paper. Furthermore, the recycling device is provided with photoelectrical sensors to sense the discarded duplicate playing cards, achieving an automatic recycling effect.

DETAILED DESCRIPTION OF THE PREFERRED EMBODIMENT

Embodiments of the present invention will now be described, by way of example only, with reference to the accompanying drawings.

Figure 1:
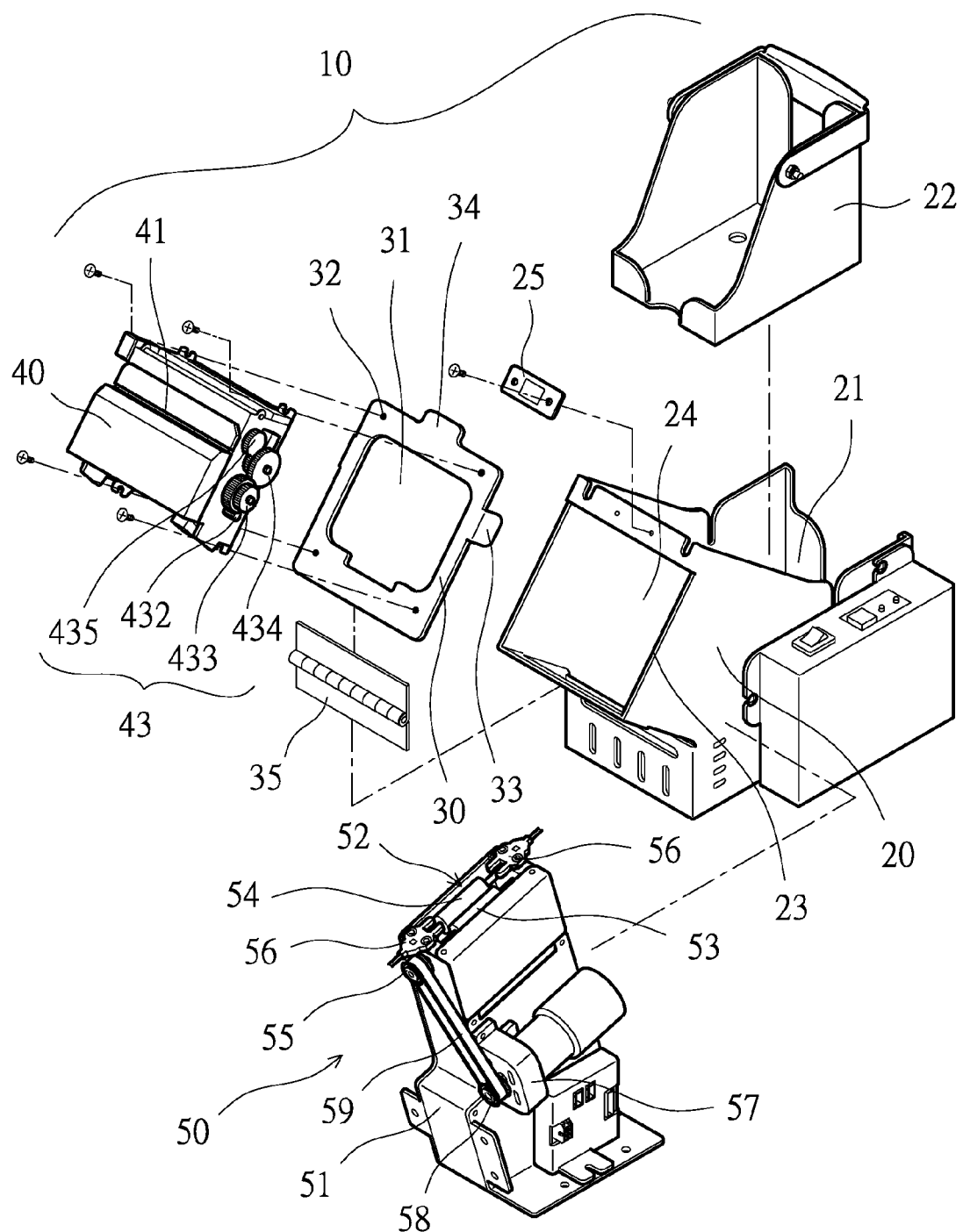
FIG. 1 is an exploded view of the present invention.
Figure 2:
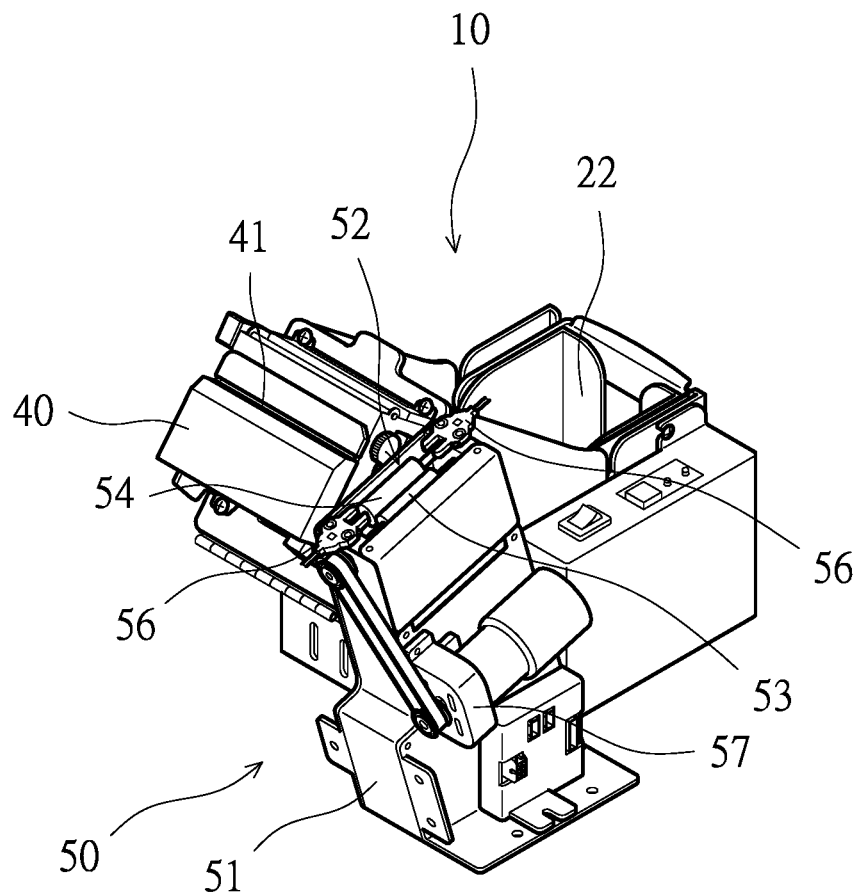
FIG. 2 is a perspective view of the present invention.
Figure 3:
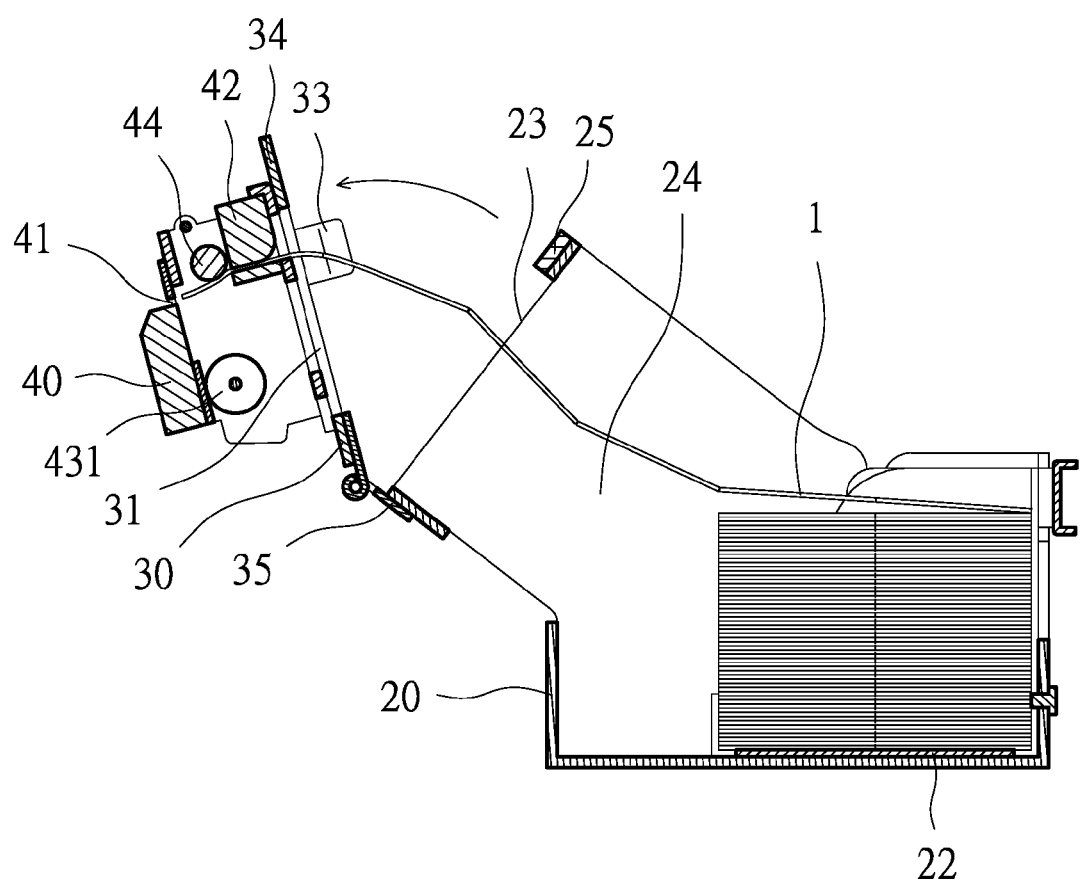
FIG. 3 is a side cross-sectional view of the present invention, showing that the movable frame is opened for installing the printing paper.
Figure 4:
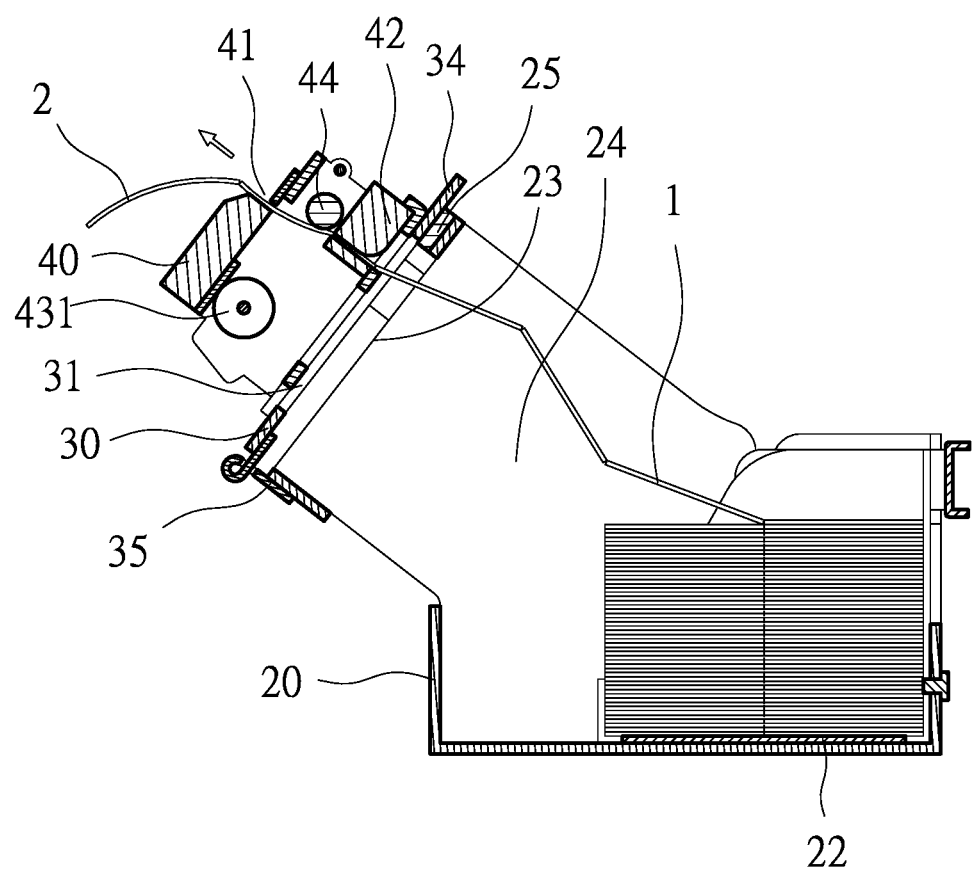
FIG. 4 is a side cross-sectional view of the present invention, showing that the duplicate playing card is printed and guided out.
Figure 5:
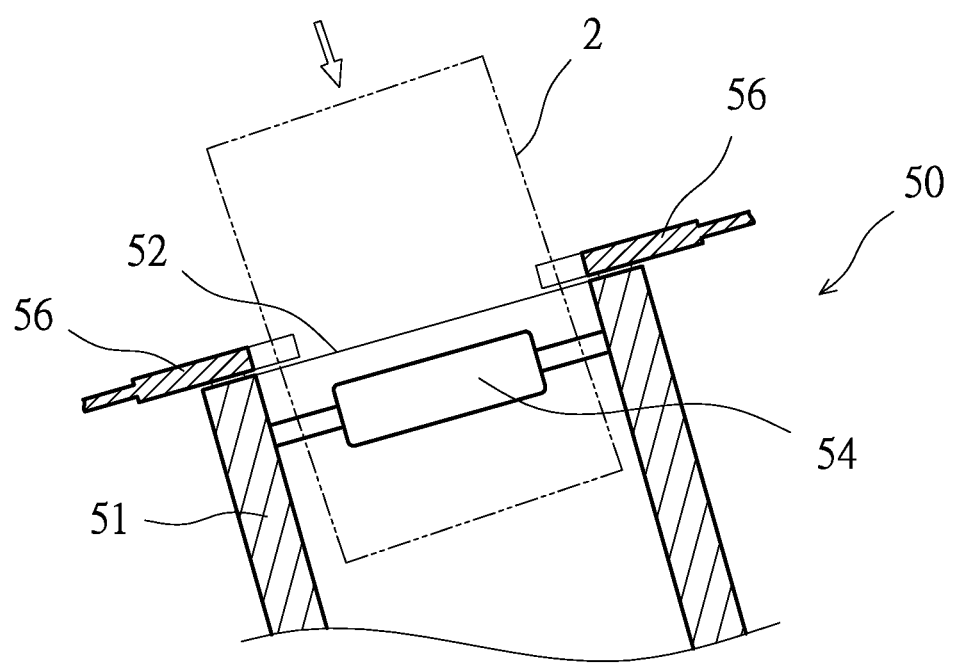
FIG. 5 is a partial side cross-sectional view of the present invention, showing that the duplicate playing card is recycled.
Figure 6:
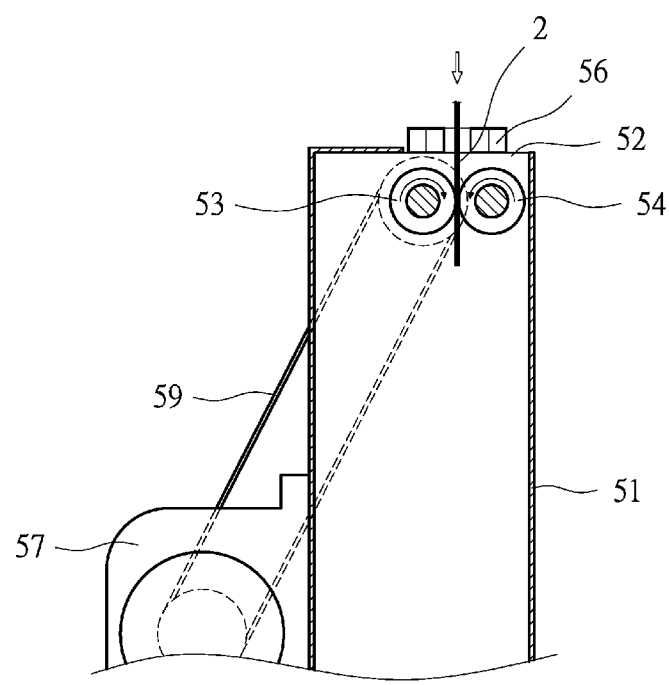
FIG. 6 is a partial rear cross-sectional view of the present invention, showing that the duplicate playing card is recycled.

As shown in FIG. 1, FIG. 2 and FIG. 3, the duplicate playing card output and recycling device of the present invention comprises a printing device 10 and a recycling device 50. The printing device 10 comprises a seat body 20, a movable frame 30, and a printer 40. An end of the seat body 20 has an accommodating room 21 to accommodate a detachable box 22 for containing paper. Another end of the seat body 20 has an oblique passage 24 slanting upward with an opening 23. A magnetic member 25 is provided above the opening 23. The movable frame 30 has a through hole 31 corresponding to the opening 23 and screw holes 32 at four corners thereof. Two sides of the movable frame 30 are provided with limit pieces 33 extending toward two sides of the opening 23. An upper end of the movable frame 30 is provided with a protrusion 34 corresponding to the magnetic member 25, and a lower end of the movable frame 30 is provided with a hinge 35. The hinge 35 is pivotally connected to the seat body 20 and the movable frame 30. The printer 40 is connected to the movable frame 30 by means of screws to mate with the screw holes 32. An exterior of the printer 40 has a card outlet 41 communicating with the through hole 31. A printhead 42 and a transmission wheel 44 driven by a transmission mechanism 43 are provided inside the printer 40. The recycling device 50 is coupled to either side of the seat body 20. The recycling device 50 includes a recycling box 51 and a power reduction mechanism 57. The top of the recycling box 51 has a card inlet 52 communicating with the inside of the recycling box 51. A first roller 53 and a second roller 54 abut against each other and are disposed in the card inlet 52. The first roller 53 is connected with an interlocking wheel 55 disposed at an outer side of the recycling box 51. Two outer sides of the card inlet 52 are provided with photoelectrical sensors 56, respectively. The power reduction mechanism 57 is coupled to one side of the recycling box 51, and has a spindle connected with a power wheel 58. A belt 59 is wound on the interlocking wheel 55 and the power wheel 58. Through the above-mentioned device, continuous printing paper 1 can be stacked in the box 22 and can be printed by the printhead 42 driven by the transmission wheel 44. Duplicate playing cards 2 printed by the printer 40 are guided out through the card outlet 41 to the players. The duplicate playing cards 2 after use can be discarded and inserted into the card inlet 52 between the two photoelectrical sensors 56 to actuate the power reduction mechanism 57 to drive the first roller 53 and the second roller 54, such that the duplicate playing cards 2 are guided into the recycling box 51 to be collected.

The assembly and details of the present invention are described below. As shown in FIGS. 1 to 3, an electronic game system is connected to the printing apparatus of the present invention. Through a physical device (for example, a robotic arm) to deal the playing card in accordance with the rules of the game, the signal of the playing card is transmitted to the player terminal and displayed on the screen. The electronic game system according to the suit and numeral of the playing card (at this time, the electronic game system has dealt the playing card to the player, but the playing card has not been showed, in a covered state), sends the signal of the playing card to the printing device and prints a duplicate playing card having the same suit and numeral as the game to the player, whereby the player can touch the real playing card in the virtual electronic game and squint to know the playing card so as to enhance the excitement of the game. The protrusion 34 of the movable frame 30 of the present invention is made of a ferromagnetic material, such as iron, cobalt or nickel and the like. The magnetic member 25 may be an assembly having a magnet. The protrusion 34 is attracted by the magnetic member 25. The two limit pieces 33 hold against the two sides of the opening 23 of the seat body 20, so that the movable frame 30 can be firmly positioned on the opening 23. The through hole 31, the inside of the printer 40, and the oblique passage 24 are in communication with each other. Further, the transmission mechanism 43 of the printer 40 includes a power gear 432 driven by a motor 431 to bring a first gear 433 and a second gear 434 which are meshed with each other and disposed at an outer side of the printer 40. An end of the transmission wheel 44 is provided with a driven gear 435 to mesh with the second gear 434, so that the transmission wheel 44 can bring the printing paper 1 to the card outlet 41. The recycling device 50 is couplet to one side of the printing device 10, which is beneficial to reduce the overall volume of the recycling device 50 and the printing device 10, achieving the effect of not occupying a space.

Referring to FIGS. 1 to 4, when in use, the box 22 is filled with the folded printing paper 1, and then the box 22 is placed into the accommodation room 22 of the seat body 20. Because the box 22 is detachable, the printing paper 1 can be quickly changed. After that, the movable frame 30 is opened, and one end of the printing paper 1 is inserted through the printhead 42 and the lower edge of the transmission wheel 44 (as shown in FIG. 3) to extend out of the card outlet 41 and exposed outside the printer 40. Afterwards, the movable frame 30 covers the opening 23. The oblique passage 24 slanting upward enables the printing paper 1 to be conveyed obliquely upward, which is beneficial for the output of the printing paper 1. When the electronic game deals a playing card to the player, the playing card is displayed on the player terminal in a closed state. The printer 40 receives the signal command from the electronic game system, and the transmission mechanism 43 drives the transmission wheel 44 to bring the printing paper 1, and the printhead 42 prints a duplicate playing card 2 same as that one displayed on the player terminal. The duplicate playing card 2 is guided out from the card outlet 41, and then the player obtains the duplicate playing card 2 to squint the playing card, so that the player has the pleasure and excitement of getting the real playing card. The present invention changes the monotonous operation procedure of the electronic automated playing card game machine. When the player completes the action such as squinting, the player will know the playing card. The player needs to discard the duplicate playing card 2 to the recycling device 50. The duplicate playing card 2 is inserted into the card inlet 52. The two photoelectrical sensors 56 at the two sides of the card inlet 52 are interrupted to generate an inductive signal. The signal enables the electronic game system to confirm that the player has completed the action of squinting and display the playing card on the player terminal. The power reduction mechanism 57 is actuated to drive the power wheel 58, allowing the belt 59 to drive the interlocking wheel 55 to rotate the first roller 53 and the second roller 54 simultaneously. The duplicate playing card 2 placed into the card inlet 52 is rolled into the recycling box 51. After the duplicate playing card 2 passes completely through the photoelectrical sensors 56, the power supply of the power reduction mechanism 57 is turned off. The discarded duplicate playing cards 2 can be collected.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A duplicate playing card output and recycling device, comprising a printing device and a recycling device; the printing device including a seat body, a movable frame, and a printer; an end of the seat body having an accommodating room to accommodate a detachable box for containing paper, another end of the seat body having an oblique passage with an opening, a magnetic member being provided above the opening; the movable frame having a through hole corresponding to the opening and screw holes at four corners thereof, an upper end of the movable frame being provided with a protrusion corresponding to the magnetic member, the protrusion being attracted to the magnetic member, a lower end of the movable frame being provided with a hinge, the hinge being is pivotally connected to the seat body and the movable frame; the printer being connected to the movable frame by means of screws to mate with the screw holes, an exterior of the printer having a card outlet communicating with the through hole, a printhead and a transmission wheel driven by a transmission mechanism being provided inside the printer; the recycling device being coupled to a side of the seat body, the recycling device including a recycling box and a power reduction mechanism, a top of the recycling box having a card inlet communicating with an inside of the recycling box, a first roller and a second roller abutting against each other and being disposed in the card inlet, the first roller being connected with an interlocking wheel disposed at an outer side of the recycling box; two outer sides of the card inlet being provided with photoelectrical sensors respectively; the power reduction mechanism being coupled to one side of the recycling box and having a spindle connected with a power wheel, a belt being wound on the interlocking wheel and the power wheel.

2. The duplicate playing card output and recycling device as claimed in claim 1, wherein the transmission mechanism includes a power gear to bring a first gear and a second gear which are meshed with each other and disposed at an outer side of the printer, and an end of the transmission wheel is provided with a driven gear to mesh with the second gear.

3. The duplicate playing card output and recycling device as claimed in claim 1, wherein two sides of the movable frame are provided with limit pieces extending toward two sides of the opening, and the two limit pieces hold against the two sides of the opening.

4. The duplicate playing card output and recycling device as claimed in claim 1, wherein the oblique passage slants upward.

\* \* \* \* \*